(12) United States Patent
Knezevic et al.

(10) Patent No.: US 10,680,798 B2
(45) Date of Patent: Jun. 9, 2020

(54) MASKING STORAGE TRANSFER TO PROTECT AGAINST ATTACKS

(71) Applicant: NXP USA, INC., Austin, TX (US)

(72) Inventors: Miroslav Knezevic, Heverlee (BE); Ventzislav Nikov, Heverlee (BE)

(73) Assignee: NXP USA, Inc., Austin, TX (US)

( * ) Notice: Subject to any disclaimer, the term of this patent is extended or adjusted under 35 U.S.C. 154(b) by 456 days.

(21) Appl. No.: 15/433,556

(22) Filed: Feb. 15, 2017

(65) Prior Publication Data
US 2018/0234233 A1    Aug. 16, 2018

(51) Int. Cl.
| H04L 9/00 | (2006.01) |
| G06F 21/78 | (2013.01) |
| H04L 9/06 | (2006.01) |
| H04L 9/08 | (2006.01) |

(52) U.S. Cl.
CPC .............. *H04L 9/004* (2013.01); *G06F 21/78* (2013.01); *H04L 9/0631* (2013.01); *H04L 9/085* (2013.01); *H04L 9/0894* (2013.01); *H04L 2209/04* (2013.01); *H04L 2209/046* (2013.01)

(58) Field of Classification Search
CPC ......... H04L 9/004; H04L 9/063; H04L 9/085; H04L 9/0894; G06F 21/78
See application file for complete search history.

(56) References Cited

U.S. PATENT DOCUMENTS

| 9,411,524 | B2 | 8/2016 | O'Hare et al. | |
| 2001/0053220 | A1* | 12/2001 | Kocher | G06F 21/556 380/29 |
| 2008/0082834 | A1* | 4/2008 | Mattsson | G06F 21/6209 713/189 |
| 2009/0094251 | A1 | 4/2009 | Gladwin et al. | |
| 2010/0268877 | A1 | 10/2010 | Resch et al. | |
| 2011/0246766 | A1* | 10/2011 | Orsini | G06F 11/1076 713/160 |
| 2011/0286594 | A1* | 11/2011 | Resch | H04L 9/085 380/46 |
| 2012/0221854 | A1* | 8/2012 | Orsini | G06F 21/606 713/167 |
| 2014/0074719 | A1 | 3/2014 | Gressel et al. | |
| 2017/0373831 | A1* | 12/2017 | Wurcker | H04L 9/002 |

OTHER PUBLICATIONS

Houssem Maghrebi et al. (2012) Optimal First-Order Masking with Linear and Non-Linear Bijections (extended version), pp. 1-29 at https://eprint.iacr.org/2012/175.pdf.

Houssem Meghrebi et al. (2012) Register Leakage Masking Using Gray Code, IEEE International Symposium on Hardware-Oriented Security and Trust, pp. 37-42.

* cited by examiner

*Primary Examiner* — Khalil Naghdali

(57) ABSTRACT

A secure computing device, including: a processor configured to carry out a secure operation; a memory in communication with the processer configured to store secure data; and a memory controller configured control storage of data in the memory and reading data from the memory, wherein the secure data is split into shares before being stored in the memory and wherein the memory controller is configured to: apply a masking storage transform (MST) to one of the shares to produce a masked share before storing the shares in the memory, wherein the MST is a permutation without a fixed point; apply an inverse MST to the masked share when reading the shares from the memory; and combine the read shares to reconstruct the secure data.

21 Claims, 4 Drawing Sheets

AFTER ShiftRows

| s00 | s01 | s02 | s03 |
| --- | --- | --- | --- |
| s10 | s11 | s12 | s13 |
| s20 | s21 | s22 | s23 |
| s30 | s31 | s32 | s33 |

FIG. 2A

FAULT INJECTED ON s00

| s00 | s01 | s02 | s03 |
| --- | --- | --- | --- |
| s10 | s11 | s12 | s13 |
| s20 | s21 | s22 | s23 |
| s30 | s31 | s32 | s33 |

FIG. 2B

AFTER MixColumns, AddRoundKey, SubBytes

| s00 | s01 | s02 | s03 |
| --- | --- | --- | --- |
| s10 | s11 | s12 | s13 |
| s20 | s21 | s22 | s23 |
| s30 | s31 | s32 | s33 |

FIG. 2C

AFTER ShiftRows

| s00 | s01 | s02 | s03 |
| --- | --- | --- | --- |
| s10 | s11 | s12 | s13 |
| s20 | s21 | s22 | s23 |
| s30 | s31 | s32 | s33 |

FIG. 2D

FAULT INJECTED ON s00'

| s00' | s01' | s02' | s03' |
|------|------|------|------|
| s10' | s11' | s12' | s13' |
| s20' | s21' | s22' | s23' |
| s30' | s31' | s32' | s33' |

FIG. 3A

AFTER INVERSE MST

| s00 | s01 | s02 | s03 |
|-----|-----|-----|-----|
| s10 | s11 | s12 | s13 |
| s20 | s21 | s22 | s23 |
| s30 | s31 | s32 | s33 |

FIG. 3B

AFTER MixColumns

| s00' | s01' | s02' | s03' |
|------|------|------|------|
| s10' | s11' | s12' | s13' |
| s20' | s21' | s22' | s23' |
| s30' | s31' | s32' | s33' |

FIG. 3C

MASKING STORAGE TRANSFER TO PROTECT AGAINST ATTACKS

TECHNICAL FIELD

Various exemplary embodiments disclosed herein relate generally to a masking storage transform that protects against safe error attacks, differential fault attacks, and higher-order side channel attacks.

BACKGROUND

Safe error attacks (SEA) are one of the most powerful fault injection mechanisms used to gain the knowledge of secret data stored inside hardware. Its simplicity makes the attack very effective, the whole procedure can be summarized as follows.

Assume the implementation of a block cipher is under attack. The implementation executes an encryption operation, producing the result c=ENC(p,k), where c is a ciphertext, p is a plaintext, and k is a secret key. Assume the secret key is stored in memory and the attacker has means to learn the physical location of the individual bits of the key. Assume further that the attacker is capable of forcing individual memory bits to zero (the same discussion holds for setting the bits to one). Next, the attacker runs an encryption and observes the result, i.e., ciphertext c. The attacker then locates the most significant bit of the secret key, denoted as k[MSB], forces this bit to zero, and observes the new result. If the result changes, the attacker learns that k[MSB] has been holding a value of logical one before the change. If the result stays unchanged, the attacker learns that the logical bit was zero before the fault attempt. In either case, only with a single trial, the attacker learns one bit of information about the secret key. The same procedure is then applied for all the other key bits until the whole key is revealed.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a secure computing device, including: a processor configured to carry out a secure operation; a memory in communication with the processer configured to store secure data; and a memory controller configured control storage of data in the memory and reading data from the memory, wherein the secure data is split into shares before being stored in the memory and wherein the memory controller is configured to: apply a masking storage transform (MST) to one of the shares to produce a masked share before storing the shares in the memory, wherein the MST is a permutation without a fixed point; apply an inverse MST to the masked share when reading the shares from the memory; and combine the read shares to reconstruct the secure data.

Various embodiments are described wherein secure data is split into two shares and the MST is applied to the two shares.

Various embodiments are described wherein secure data is split into three shares and the MST is applied to two shares.

Various embodiments are described wherein the memory controller is integrated into the secure memory.

Various embodiments are described wherein the memory controller is integrated into the secure processor.

Various embodiments are described wherein applying the MST to one of the shares includes splitting the share into a plurality of portions and the applying substitution functions to the portions of the share to be masked.

Various embodiments are described wherein applying the inverse MST to the masked shares includes applying the inverse substitution functions to the portions of the masked share.

Various embodiments are described wherein the substitution functions are non-linear functions including quadratic and cubic transformations.

Various embodiments are described wherein the MST is configured such that when a single bit of the masked share is changed then at least two bits of the reconstructed secure data are different from the secure data.

Various embodiments are described wherein secure data is split into two shares and the MST is applied to one of the two shares and a different MST is applied to the other share.

Further various exemplary embodiments relate to a method of storing secure data in a memory, including: splitting the secure data into a first share and a second share; applying a masking storage transform (MST) to the first share to produce at a first masked share, wherein the MST is a permutation without a fixed point; storing the first masked share and the second share in the memory; reading the first masked share and the second share from the memory; applying an inverse MST to the first masked share to produce an unmasked first share; and combining the unmasked first share and the second share to reconstruct the secure data.

Various embodiments are described wherein the MST is also applied to the first share.

Various embodiments are described wherein secure data is also split into a third share and the MST is applied to the first share and the third share.

Various embodiments are described wherein applying the MST to the first share includes applying substitution functions to portions of the first share.

Various embodiments are described wherein applying the inverse MST to the first masked share includes applying the inverse substitution functions to the portions of the first masked share.

Various embodiments are described wherein the substitution functions are non-linear functions including one of a quadratic transformation and a cubic transformation.

Various embodiments are described wherein a different MST is also applied to the second share to produce a second masked share that replaces the second masked share and wherein an inverse of the different MST is applied to the second masked share to reproduce the second share.

Various embodiments are described wherein the secure operation is part of a white-box operation implementation, wherein the MST is combined with a lookup table (LUT) resulting in a single LUT.

Various embodiments are described wherein the MST is configured such that when a single bit of the masked share is changed then at least two bits of the reconstructed secure data are different from the secure data.

Further various exemplary embodiments relate to a non-transitory machine-readable storage medium encoded with instructions for storing secure data in a memory, including: instructions for splitting the secure data into a first share and a second share; instructions for applying a masking storage transform (MST) to the first shares to produce a first masked share, wherein the MST is a permutation without a fixed point; instructions for storing the first masked share and the second share in the memory; instructions for reading the first masked share and the second share from the memory; instructions for applying an inverse MST to the first masked share to produce an unmasked first share; instructions for combining the unmasked first share and the second share to reconstruct the secure data.

Various embodiments are described wherein the MST is configured such that when a single bit of the masked share is changed then at least two bits of the reconstructed secure data are different from the secure data.

BRIEF DESCRIPTION OF THE DRAWINGS

In order to better understand various exemplary embodiments, reference is made to the accompanying drawings, wherein:

FIGS. 2A-2D illustrate the propagation of a fault through state of AES at different steps of a round when a MST is not applied;

FIG. 3A illustrates a fault injected in by s00' of the AES state with applied MST protection;

FIG. 3B illustrates the AES state after the application of the inverse MST;

FIG. 3C illustrates how the fault has propagated throughout the whole AES state after the MixColumns operation.

To facilitate understanding, identical reference numerals have been used to designate elements having substantially the same or similar structure and/or substantially the same or similar function.

DETAILED DESCRIPTION

Figure 1:
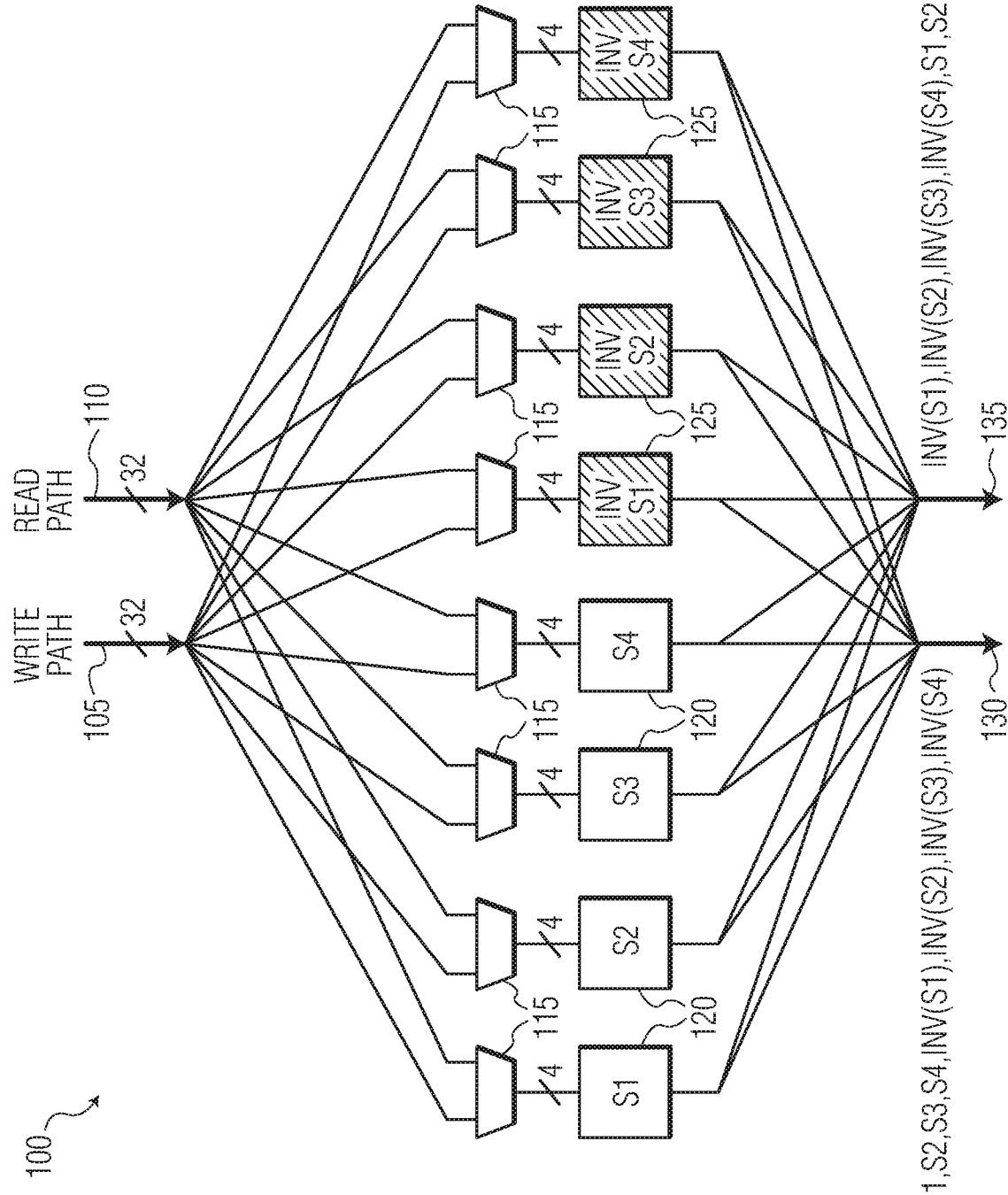
FIG. 1 describes an embodiment of the MST.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

There are several known mechanisms which decrease probability of successful SEA over physical implementation. Masking the secret value is one of them. Assume the key is masked (i.e., shared across two or more shares) such that k=mk⊕m, where mk is a masked key value and m is a mask. To mount a successful SEA, the attacker now needs to locate both mk[MSB] and m[MSB] and force them to zero. Similar to the case described above, depending on the outcome (the result has changed or not), the attacker will learn the plain value of the key bit k[MSB]. There are other countermeasures such as Error Detection Codes and Error Correction Codes if they are applied along with masking; and also physical memory shuffling, which all increase the complexity of mounting a successful SEA.

Differential fault attacks (DFA) are a type of fault injection attack in which the attacker aims at injecting faults which may help in cryptanalyzing the erroneous output.

Finally, the higher order side channel attacks (SCA) assume that the attacker can combine the information of multiple shares in order to successfully retrieve the information about the plain value. To achieve this, the attacker typically collects many power traces and then uses statistical methods like higher orders of univariate standardized central moments to distinguish the correct key byte guess against the incorrect guesses.

Embodiments of a Masking Storage Transform (MST) are described below. The MST protects data at rest (i.e. when data is stored) against the three types of physical attacks described above (DFA, SEA and SCA). It is noted that the efficiency of the MST is much higher than any of the previously mentioned countermeasures, considering both the level of protection it offers as well as the implementation costs. What is particularly interesting about MST is that the whole scheme may remain public without compromising its protection level.

The MST will now be described. Assume a secret key k is to be stored in memory in two shares: one share being a masked key value mk, and another share being its mask m. Before storing the actual values, one of the key shares is processed using a function denoted as MST. Hence, the value that finally gets stored in memory is mk unaltered and m'=MST(m). Assume m is divided into words of fixed size, for simplicity here of 4 bits, denoted by m_i, then one way to apply MST is m_i'=MST(m_i). However MST may be also applied by first forming from each four m_i four words n_j of same size by taking j-th bit from m_i and then obtaining n_j'=MST(n_j). In order to provide protection MST should possess special properties. The MST may be a permutation (bijection) without a fixed point (i.e., meaning there is no input m for which the output will be m again). Alternatively or in addition, the MST may be a permutation such that any single bit change of m' causes multiple bit changes in m when m is calculated using the inverse MST on the altered m'. The MST may satisfy when one changes a single bit of m, then multiple bits of m' changes as well. The MST may be a linear transform, but a non-linear transform provides even stronger protection especially against SCA. In the embodiment described below, one possible practical realization of MST is illustrated. When the value of m' is read from memory, the inverse function is then applied first to obtain the plain value of m, i.e., m=MST$^{-1}$(m') and then the data is processed as intended.

Note that the provided description can be naturally extended and applied to a case where two but different MSTs are applied simultaneously to each of the shares and to data having more than two shares.

To mount a Safe Error Attack, the attacker needs to force a single bit of mk as before, but then he needs to control multiple bits of m' in order to affect a single bit of m. In addition, the attacker has no knowledge of the content of m' (the data is in shared form, hence its shares appear purely random) and is therefore not able to deduce which bits need to be affected such that the corresponding bits of both m and mk are affected. Note that the MST may be a transform known to the attacker and may also be linear. Finally, any single bit force of m' will affect multiple bits of m, so the attacker will not be able to learn the actual logical plain value of k.

An embodiment of the MST will now be described. Assume the secret value to be protected is split in two shares (masked value and its mask) and stored in two different register banks. For simplicity, assume further that the register bank we apply the protection to has a 32-bit read/write interface. In order to protect against the Safe Error Attacks, a MST is applied to one of the shares. FIG. 1 describes an embodiment of the MST.

The MST 100 has a write path 105 where a share of the key data is written to memory. The MST 100 also has a read path 110 where the share of the key data is read from memory. The MST 100 includes multiplexers 115 that select between the read path 105 and the write path 110. The output of the multiplexers 115 may then be input into S-boxes 120 and 125. The MST 100 is implemented such that the first four 4-bit nibbles are transformed using 4-bit S-boxes 120 (denoted as S1, S2, S3, S4), and the second four 4-bit nibbles are transformed using 4-bit inverse S-boxes 125 (denoted as INV(S1), INV(S2), INV(S3), INV(S4)). The outputs of the S-boxes 120 and 125 (S1, S2, S3, S4, INV(S1), INV(S2), INV(S3), INV(S4)) are then concatenated to produce the output of the MST 100. During the writing cycle, the input value is transformed using the MST 100 by inputting 4-bit nibbles into the S-boxes 120 and 125, and the result is stored in memory. During the reading cycle, the transformed data is processed by the inverse MST 100 which is constructed as concatenation of the outputs of S-boxes INV(S1), INV(S2), INV(S3), INV(S4), S1, S2, S3, S4 where the inputs are arranged so that the output of S-box S1 from the write operation is input to S-box INV(S1), . . . , and the output of the S-box INV(S4) is input to S-box S4. As a result the data when stored and read goes through an S-box transform followed by its inverse, or an inverse S-box transform followed by the S-box. In either case the data is restored to its original value. As an example one can use the following S-boxes defined for the PRINCE family of ciphers:

S1[16]={C, 8, 5, D, B, 2, 7, F, 3, E, 4, 0, 9, A, 1, 6};
S2[16]={3, 4, 6, D, A, C, F, E, 5, 1, 7, 9, 2, 0, 8, B};
S3[16]={B, 9, 3, 7, 0, D, A, F, 6, 8, 1, E, 5, C, 2, 4};
S4[16]={F, 7, E, 8, B, 0, A, 4, 6, 2, 5, C, 9, 3, D, 1};
InvS1[16]={B, E, 5, 8, A, 2, F, 6, 1, C, D, 4, 0, 3, 9, 7};
InvS2[16]={D, 9, C, 0, 1, 8, 2, A, E, B, 4, F, 5, 3, 7, 6};
InvS3[16]={4, A, E, 2, F, C, 8, 3, 9, 1, 6, 0, D, 5, B, 7}; and
InvS4[16]={5, F, 9, D, 7, A, 8, 1, 3, C, 6, 4, B, E, 2, 0};

It is noted that these S-boxes should have some properties to be used as MST. For example, in order to counter SEA the chosen S-boxes should not have a fixed point. While in order to, protect against DFA at least two bits of the S-box output have to change when a single bit of the input is changed. The same property should hold also for the inverse S-box. As a result, this makes it harder for an attacker to determine the value of the key share stored in memory. It is also noted that instead of using INV(S1), INV(S2), INV(S3), INV(S4) for the last four S-boxes, four other completely different S-boxes may be used that have the properties described above. Then the read path would implement the inverse of each of the eight S-boxes. The implementation described above allows for using the same basic structure for both the read and write path.

It will now be shown that the MST gives additional protection against higher order side channel attacks when at least one share is altered using the MST. This will be illustrated by computing the Pearson correlation of univariate standardized central moments of 1st, 2nd, 3rd and 4th order in the standard Hamming Weight Model (HWM). Thus, the correlation of the plain (unshared) value p with the stored shared value q (or its powers) is computed using HWM. For that purpose, examples are given where a byte stored in two shares and in three shares where no transformation over the shares is performed, then different combinations of MST are applied to the shares, and the results are compared. The MST described above is used in the comparisons. It is noted that S1 and S2 are quadratic transformations, and S3 and S4 are cubic transformations.

Table 1 below provides various examples for comparison. The table includes two columns. One for two shares and the other for three shares. Then the correlation values for shares store in plain and various combinations of applying the MST to the different shares are shown.

TABLE 1

| 2 shares | | 3 shares | |
|---|---|---|---|
| Shares storage | Correlation value | Shares storage | Correlation value |
| shares stored in plain | p_q = 0.000000<br>p_q^2 = −0.043561<br>p_q^3 = −0.079289<br>p_q^4 = −0.107326 | shares stored in plain | p_q = 0.000000<br>p_q^2 = 0.000000<br>p_q^3 = 0.001858<br>p_q^4 = 0.004975 |
| Using (S1∥S2) over 1 share | p_q = 0.000000<br>p_q^2 = −0.005445<br>p_q^3 = −0.009601<br>p_q^4 = −0.012920 | Using (S1∥S2) over 1 share | p_q = 0.000000<br>p_q^2 = 0.000000<br>p_q^3 = 0.000232<br>p_q^4 = 0.000609 |
| Using (S3∥S4) over 1 share | p_q = 0.000000<br>p_q^2 = 0.013613<br>p_q^3 = 0.023539<br>p_q^4 = 0.030318 | Using (S3∥S4) over 1 share | p_q = 0.000000<br>p_q^2 = 0.000000<br>p_q^3 = −0.000581<br>p_q^4 = −0.001503 |
| | | Using (S1∥S2) over $2^{nd}$ share<br>Using (S3∥S4) over $3^{rd}$ share | p_q = 0.000000<br>p_q^2 = 0.000000<br>p_q^3 = −0.000174<br>p_q^4 = −0.000466 |
| Using (InvS1∥InvS2) over $1^{st}$ share<br>Using (S1∥S2) over $2^{nd}$ share | p_q = 0.000000<br>p_q^2 = 0.000000<br>p_q^3 = 0.000929<br>p_q^4 = 0.001883 | Using (InvS1∥InvS2) over $1^{st}$ share<br>Using (S1∥S2) over $2^{nd}$ share<br>Using (S3∥S4) over $3^{rd}$ share | p_q = 0.000000<br>p_q^2 = 0.000000<br>p_q^3 = 0.000000<br>p_q^4 = 0.000016 |

The first row of Table 1 shows the calculated correlation values when the shares are stored in plain. When the shares are stored in plain, the number of shares where the correlations is zero against SCA match the security order, e.g., $1^{st}$ order for the 2 share variant or $2^{nd}$ order for the 3 share variant. The second row of Table 1 shows the calculated correlation values when (S1||S2) is used in the MST. Using (S1||S2) in MST results in 10 times smaller correlation for the higher orders. The third row of Table 1 shows the calculated correlation values when (S3||S4) is used in the MST. Using (S3||S4) in the MST results only in 3 times smaller correlation for the higher orders. This is expected because (S1||S2) are quadratic while (S3||S4) are cubic transformations, and it is well known that a higher algebraic degree of a transform results in a higher leakage against SCA. The fourth row of Table 1 shows the calculated correlation values when (S1||S2) is used for the first share, and (S3||S4) is used for the second share when applying the MST. When one applies the MST to 2 out of the 3 shares we observe even 20 times smaller correlation. The fifth row of Table 1 shows the calculated correlation values when the MST is applied to all shares. The leads to the best result, i.e., one order higher security (i.e., the correlation coefficient become zero on the next higher order) and the correlation is 100 times smaller for higher orders.

If applied to both shares mk and m, the MST provides stronger security against Differential Fault Analysis. The actual implementation differs from case to case, but its effectiveness on the well-known example of DFA against AES will now be demonstrated.

FIGS. 2A-2D illustrate the propagation of a fault through state of AES at different steps of a round when MST is not applied FIG. 2A shows the state after the ShiftRows operation. An attacker attacks an AES implementation using DFA by targeting one byte of its state for fault injection after the ShiftRows operation in round 8, in particular byte s00. FIG. 2B shows the fault injection at byte s00. The operations that follow the injection of the fault, which are MixColumns, AddRoundKey, SubBytes will cause the fault to propagate to bytes s00, s10, s20, and s30 as shown in FIG. 2C. FIG. 2D shows the state after the ShiftRows step which results in four faulty bytes, in particular bytes s00, s13, s22, s31. Then after the AddRoundKey step the same four faulty bytes will be in the state resulting in a faulty cyphertext. This faulty cyphertext is then used to obtain the information about the last round key of AES, which then trivially yields the information about the whole AES secret key.

Assume now that the AES state is split into two shares and that the MST has been applied to protect one share of a masked AES state s, which is defined as s=(s00, s10, s20, s30, s01, s11, s21, s31, s02, s12, s22, s32, s03, s13, s23, s33). In other words, assume that s'=MST(s)=(s00', s10', s20', s30', s01', s11', s21', s31', s02', s12', s22', s32', s03', s13', s23', s33'). To make sure the injected error is later spread to all the bytes of the AES state, and hence to prevent the attack, the MST will ensure that changing at least one bit of s00' will cause at least one bit change in s00, s01, s02, and s03. This can be achieved for example if the MST is not applied separately to s00, s01, s02 and s03 but instead the MST is applied to the first bit of each byte s00, s01, s02 and s03 and similarly applying the MST over the $2^{nd}$, $3^{rd}$ and $4^{th}$ bits. If this property is satisfied, injecting a fault on s00' will quickly spread on all the bytes of the AES state after the following MixColumns operation. FIGS. 3A-3C illustrate the spreading of a fault across the whole AES state when the MST is applied to the AES state. It is noted that MST may be applied to contiguous bits of the share or non-contiguous bits of the share (e.g., as described above)

FIG. 3A illustrates a fault injected in by s00' of the AES state. FIG. 3B illustrates the AES state after the application of the inverse MST, which is illustrated with a dashed matrix because its value does not actually get stored in any register. Instead, this value of the AES state is only present on the read path when the data is inverted with $MST^{-1}$ such that the MixColumns operation can be properly applied to s=(s00, s10, s20, s30, s01, s11, s21, s31, s02, s12, s22, s32, s03, s13, s23, s33)=$MST^{-1}$(s'). FIG. 3C illustrates how the fault has now propagated throughout the whole AES state. This makes it very difficult for the attacker to obtain any information about the last round key as was possible before.

It is noted that the MST can be a transform known to the attacker and it can be a linear transformation. This knowledge will not help the attacker be successful. As countermeasure against DFA and SEA, a linear MST is as good as non-linear one. The only difference comes when the MST is used as countermeasure against SCA, and in that case the MST must be non-linear since it is well known that linear one will not improve the resistance against some types of SCA.

Figure 4:
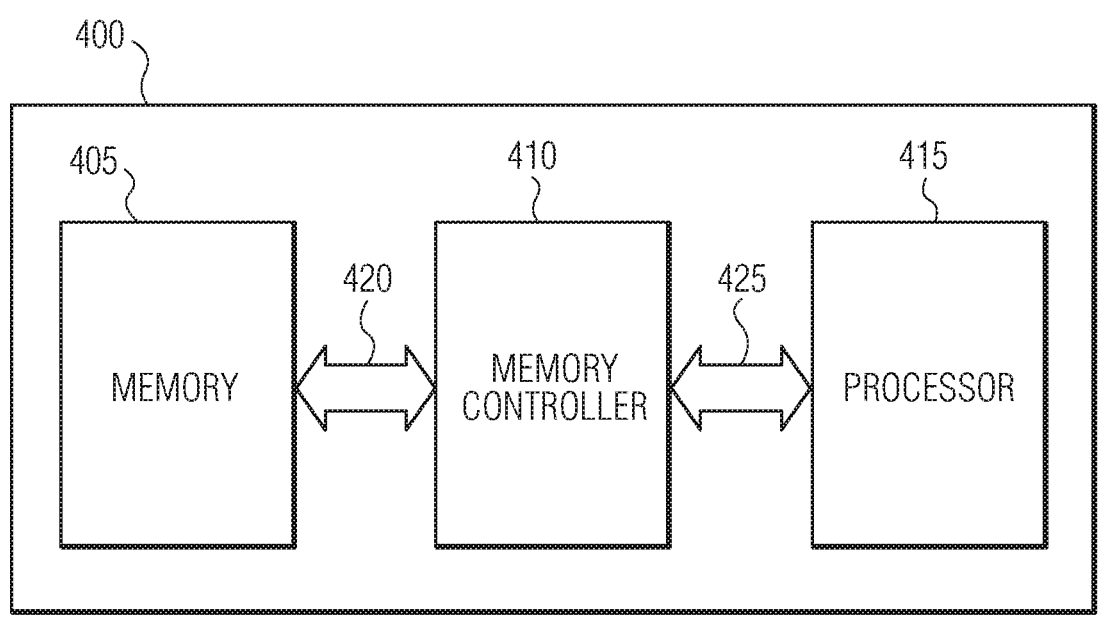
FIG. 4 illustrates a secure device that implements the MST.

FIG. 4 illustrates a secure device 400 that implements the MST. The secure device 400 includes a memory 405, a memory controller 410, and a processor 415. The memory may include various types of memory 405 such as, for example L1, L2, or L3 cache or system memory. As such, the memory 405 may include static random access memory (SRAM), dynamic RAM (DRAM), flash memory, read only memory (ROM), or other similar memory devices. The memory 405 may also be secure memory that resists tampering or access by an attacker.

The memory controller 410 controls access to the memory 405. The memory controller 405 may receive read and write requests from the processor 415. The memory controller 410 may implement share splitting of the data stored in the memory. Also, the memory controller 410 may apply the MST to the store data shares as described above. The memory controller 410 may be separate from the memory 405 and the processor 410, but may also be integrated with the memory 405 or the processor 410.

The processor 415 may be any type of processor used to implement a cryptographic function. The processor 415 may be any hardware device capable of executing instructions stored in memory 405 or other storage (not shown) or otherwise processing data. As such, the processor 415 may include a microprocessor, field programmable gate array (FPGA), application-specific integrated circuit (ASIC), or other similar devices. The processor 415 may also be a secure processor that resists tampering or access by an attacker. Further, the processor may be a specific hardware implementation of the cryptographic function.

The memory controller 410 may have a first interface 420 for communicating with the memory 405 and for controlling the memory 405. The memory controller 410 may have a second interface 425 for communicating with the processor 405.

When the processor 415 needs to store secure information in the memory 405, for example a cryptographic key, the information may be split into shares by either the processor 415 or the memory controller 410. The memory controller 410 (which may be implemented in or integrated with the processor 415) may then use the MST to modify the share(s) before they are stored in the memory 405. Then when the processor 415 seeks to read the secure information from the memory 405, the memory controller 410 reverses the MST before providing the secure data to the processor 415. As noted above, either the memory controller 410 or the processor 415 may control the splitting/combining of the data into/from shares. If the splitting of the data and application of the MST to the data is completely implemented in the memory controller 410, then the secure storage of the data using shares and the MST is completely transparent to the processor 415.

The MST may be applied to black box implementation where the secure device is not open to the attacker. This is the case where the device is implemented using only secure hardware or using software implemented on secure hardware, i.e., the memory 405, memory controller 410, and processor 415 are all secure implementations.

The MST may also be applied in white-box implementations. A white-box implementation is an implementation of the cryptographic function using software, lookup tables, or finite state machines where the attacker can completely control the operation of the white-box implementation. Various techniques have been developed to add security to white-box implementations such as using code obfuscation and using look up table (LUT) implementations to hide cryptographic keys or other secret information. The MST may be used in these white-box implementations because a) the various side channel attacks described above have also been used to attack white-box (WB) implementation of cryptographic functions and b) Differential Computation Analysis (DCA) which is analog of SCA specifically designed against white-box implementations. Because WB implementations use LUTs to protect the computations, MST combined with LUT will increase the resistance of WB against the above mentioned 3 physical attacks+DCA.

Physical attacks are serious threat against any implementation, and it is very difficult and costly to provide adequate defense against them. In particular Safe Error Attacks are one the most powerful fault injection mechanisms, and the embodiments described above circumvent this attack. In addition, the MST provides stronger protection against Differential Fault Attacks as well as against higher order Side Channel Attacks.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, key delivery systems described herein may include a computer implementing a computer program. Such system, may also include other hardware elements including storage, network interface for transmission of data with external systems as well as among elements of the key delivery systems.

In an embodiment of the invention, the computer program may include computer program code adapted to perform all the steps of a method according to the invention when the computer program is run on a computer. Preferably, the computer program is embodied on a non-transitory computer readable medium.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A secure computing device, comprising:
a processor configured to carry out a secure operation;
a memory in communication with the processer configured to store secure data; and
a memory controller configured control storage of data in the memory and reading data from the memory, wherein the secure data is split into shares before being stored in the memory and wherein the memory controller is configured to:
apply a masking storage transform (MST) to one of the shares to produce a masked share before storing the shares in the memory, wherein the MST is a permutation without a fixed point;
apply an inverse MST to the masked share when reading the shares from the memory; and
combine the read shares to reconstruct the secure data.

2. The secure device of claim 1, wherein secure data is split into two shares and the MST is applied to the two shares.

3. The secure device of claim 1, wherein secure data is split into three shares and the MST is applied to two shares.

4. The secure device of claim 1, wherein the memory controller is integrated into the secure memory.

5. The secure device of claim 1, wherein the memory controller is integrated into the secure processor.

6. The secure device of claim 1, wherein applying the MST to one of the shares includes splitting the share into a plurality of portions and the applying substitution functions to the portions of the share to be masked.

7. The secure device of claim 6, wherein applying the inverse MST to the masked shares includes applying the inverse substitution functions to the portions of the masked share.

8. The secure device of claim 1, wherein the substitution functions are non-linear functions including quadratic and cubic transformations.

9. The secure device of claim 1, wherein the MST is configured such that when a single bit of the masked share is changed then at least two bits of the reconstructed secure data are different from the secure data.

10. The secure device of claim 1, wherein secure data is split into two shares and the MST is applied to one of the two shares and a different MST is applied to the other share.

11. A method of storing secure data in a memory, comprising:
splitting the secure data into a first share and a second share;
applying a masking storage transform (MST) to the first share to produce at a first masked share, wherein the MST is a permutation without a fixed point;

storing the first masked share and the second share in the memory;

reading the first masked share and the second share from the memory;

applying an inverse MST to the first masked share to produce an unmasked first share; and combining the unmasked first share and the second share to reconstruct the secure data.

12. The method of claim 11, wherein the MST is also applied to the first share.

13. The method of claim 11, wherein secure data is also split into a third share and the MST is applied to the first share and the third share.

14. The method of claim 11, wherein applying the MST to the first share includes applying substitution functions to portions of the first share.

15. The method of claim 14, wherein applying the inverse MST to the first masked share includes applying the inverse substitution functions to the portions of the first masked share.

16. The method of claim 15, wherein the substitution functions are non-linear functions including one of a quadratic transformation and a cubic transformation.

17. The method of claim 11, wherein a different MST is also applied to the second share to produce a second masked share that replaces the second masked share and wherein an inverse of the different MST is applied to the second masked share to reproduce the second share.

18. The method of claim 11, wherein the secure operation is part of a white-box operation implementation, wherein the MST is combined with a lookup table (LUT) resulting in a single LUT.

19. The method of claim 11, wherein the MST is configured such that when a single bit of the masked share is changed then at least two bits of the reconstructed secure data are different from the secure data.

20. A non-transitory machine-readable storage medium encoded with instructions for storing secure data in a memory, comprising:

instructions for splitting the secure data into a first share and a second share;

instructions for applying a masking storage transform (MST) to the first shares to produce a first masked share, wherein the MST is a permutation without a fixed point;

instructions for storing the first masked share and the second share in the memory;

instructions for reading the first masked share and the second share from the memory;

instructions for applying an inverse MST to the first masked share to produce an unmasked first share;

instructions for combining the unmasked first share and the second share to reconstruct the secure data.

21. The non-transitory machine-readable storage medium of claim 20, wherein the MST is configured such that when a single bit of the masked share is changed then at least two bits of the reconstructed secure data are different from the secure data.

* * * * *